Feb. 6, 1951     A. D. BULL     2,540,096
AUTOMATIC RECORDING INFILTROMETER
Filed Aug. 19, 1949
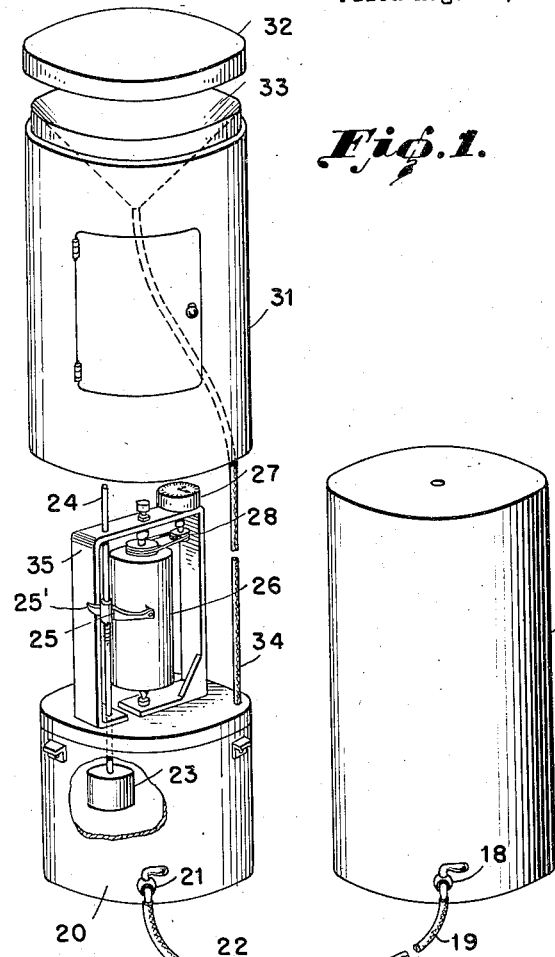
*Fig. 1.*
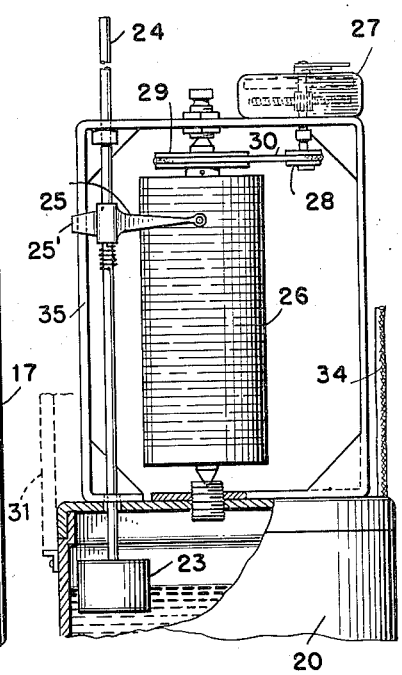
*Fig. 2.*
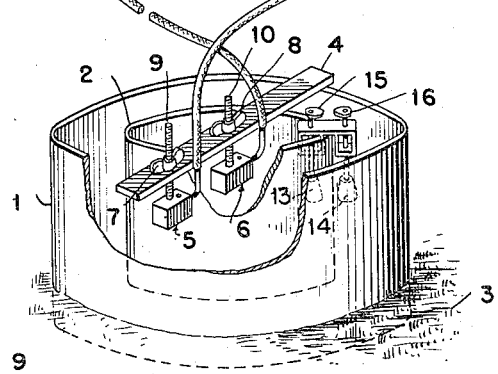
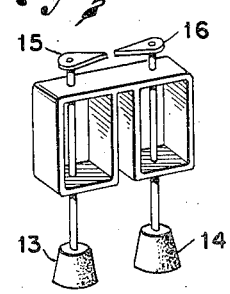
*Fig. 3.*
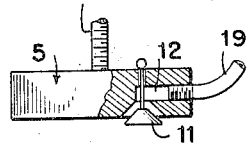
*Fig. 4.*    BY
INVENTOR
A. D. BULL
J. M. Mantell
ATTORNEY Patented Feb. 6, 1951

2,540,096

UNITED STATES PATENT OFFICE 2,540,096

AUTOMATIC RECORDING INFILTROMETER

Almond D. Bull, Woodward, Okla.

Application August 19, 1949, Serial No. 111,294

3 Claims. (Cl. 73—38)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to an apparatus for determining infiltration rates in soils. It particularly relates to an automatic apparatus for recording the amount of water infiltrating the soil in a given time.

An object of this invention is to provide an automatic recording apparatus capable of use in the field by persons comparatively unskilled in soil science. The determination of water permeability in soils is standard practice in soil surveys.

The apparatus is particularly useful in determining soil infiltration rates by the concentric ring method.

An additional advantage of the apparatus is its ready convertability into a rain gage.

One embodiment of the invention is illustrated in the drawing in which:

Figure 1 is an assembled view;

Figure 2 is a detail of the recorder;

Figure 3 is a detail of a water level visual indicator;

Figure 4 is a detail of a water-level maintaining float valve.

In Figure 1 concentric rings or casings 1 and 2 are driven into the ground 3 to obtain a water holding seal. Bar 4, placed upon the rings, supports constant water level maintaining blocks 5 and 6. Blocks 5 and 6 are adjusted to the same level by means of screws 9 and 10, and thumb nuts 7 and 8. Water is added to bring the level up to the operating point on blocks 5 and 6, which level is preferably two inches. When the water level rises above floats 11 (Figure 4) passage 12 is closed. Each block 5 and 6 is provided with a float 11.

In Figure 3, floats 13 and 14 operate pointers 15 and 16 to indicate whether the same level is being maintained within the concentric rings.

Water from tank 17 is not measured but is used to maintain the water level in the outer annulus between ring 1 and ring 2 at the same height as the water level inside ring 2. This holds the water from ring 2 in place as it enters the soil below. The water is run into block 5 through valve 18 and hose 19.

Tank 20 supplies measured amounts of water. Tank 20 is preferably of the same diameter as ring 2, so that one inch of water removed from tank 20 is equivalent to one inch removed from ring 2. Water from tank 20 is run into block 6, into ring 2, through valve 21 and hose 22.

In operation, after adding water to adjust the level to blocks 5 and 6, valves 18 and 21 are thereupon opened. As water is used out of tank 20, float 23 moves downwardly, carrying rod 24. Rod 24 carries a pen 25 which is spring pressed against drum 26. Drum 26 is turned at constant speed by clock 27 through pulleys 28 and 29, and belt 30. Block 6 feeds the water at a constant head into ring 2 which holds the water in contact with the soil. As water is taken up by the soil, float 23 and pen 25 are lowered. The surface speed of the drum is preferably one inch per ten minutes.

The recorder is provided with a cover 31 and lid 32 useful in rough weather. The device may also be used as a rain gage. A funnel 33 and pipe 34 are provided for this purpose. Projection 25' on pen 25 abuts the frame 35, to prevent turning.

Having thus described my invention, I claim:

1. A recording liquid infiltrometer for soils, comprising: inner and outer casings adapted to be driven into the soil; means for feeding liquid into the annular space between the casings; means for feeding liquid into the inner casing; liquid level operated means to control the rate of feeding liquid into the annular space; second liquid level operated means to control the rate of feeding liquid into the inner casing; the means for feeding liquid into the inner casing including a reservoir; a record making instrument operated by the lowering of the liquid level in said reservoir.

2. A recording water infiltrometer for soils, comprising: inner and outer casings adapted to be driven into the soil; means for feeding water into the annular space between the casings, including a float valve controlled water inlet in said space; means for feeding water into the inner casing including a float valve controlled water inlet in said casing; means to adjust the float valves at the same level; a reservoir for water communicating with the latter float valve controlled water inlet; a float in said reservoir; a record marker operated by the lowering of the liquid level in said reservoir; and a rotating drum cooperating with the marker to form a water-infiltration-time record.

3. A recording water infiltrometer comprising: inner and outer casings adapted to be driven into the soil; valve controlled means for maintaining a constant common level of water inside the inner casing and in the annular space between the casings; a water reservoir; means for measuring and recording the amount of water released, from the reservoir, by the valve means into the inner casing per unit time, in maintaining said constant water level.

ALMOND D. BULL.

REFERENCES CITED

The following references are of record in the file of this patent:

UNITED STATES PATENTS

| Number | Name | Date |
|---|---|---|
| 49,851 | Bogue | Sept. 12, 1865 |
| 996,546 | Watson | June 27, 1911 |

OTHER REFERENCES

Journal of the American Society of Agronomy, vol. 27, page 338–9.